No. 798,251. PATENTED AUG. 29, 1905.
H. T. AVERAY-JONES.
APPARATUS FOR MANUFACTURING CONFECTIONERY AND THE LIKE.
APPLICATION FILED JAN. 4, 1904.
3 SHEETS—SHEET 3.
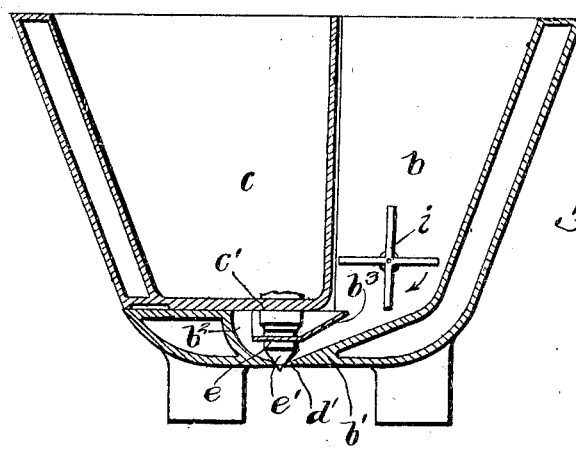
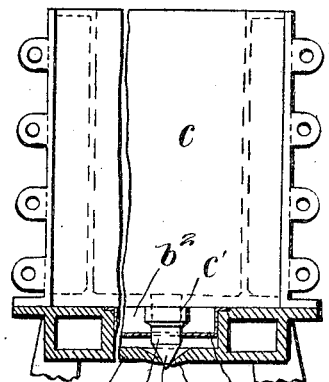
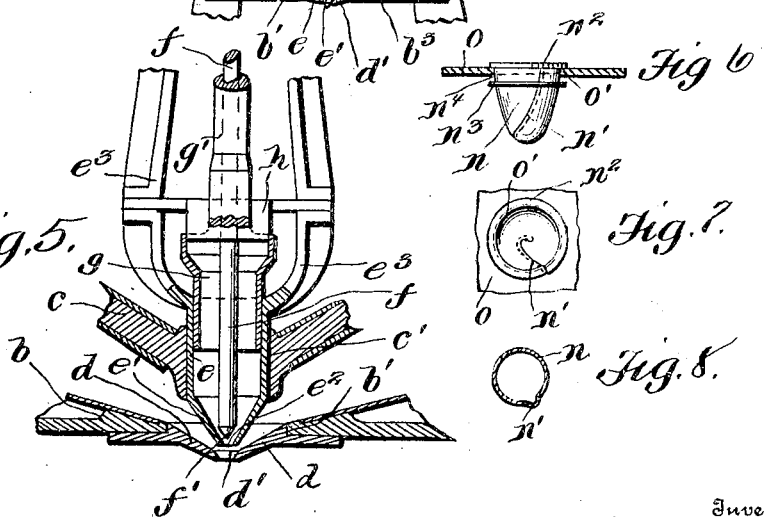
Witnesses
R. A. Boswell
Wm. J. Whalley
Inventor
Herbert Thomas Averay Jones
By Sturtevant & Greeley
Attorneys

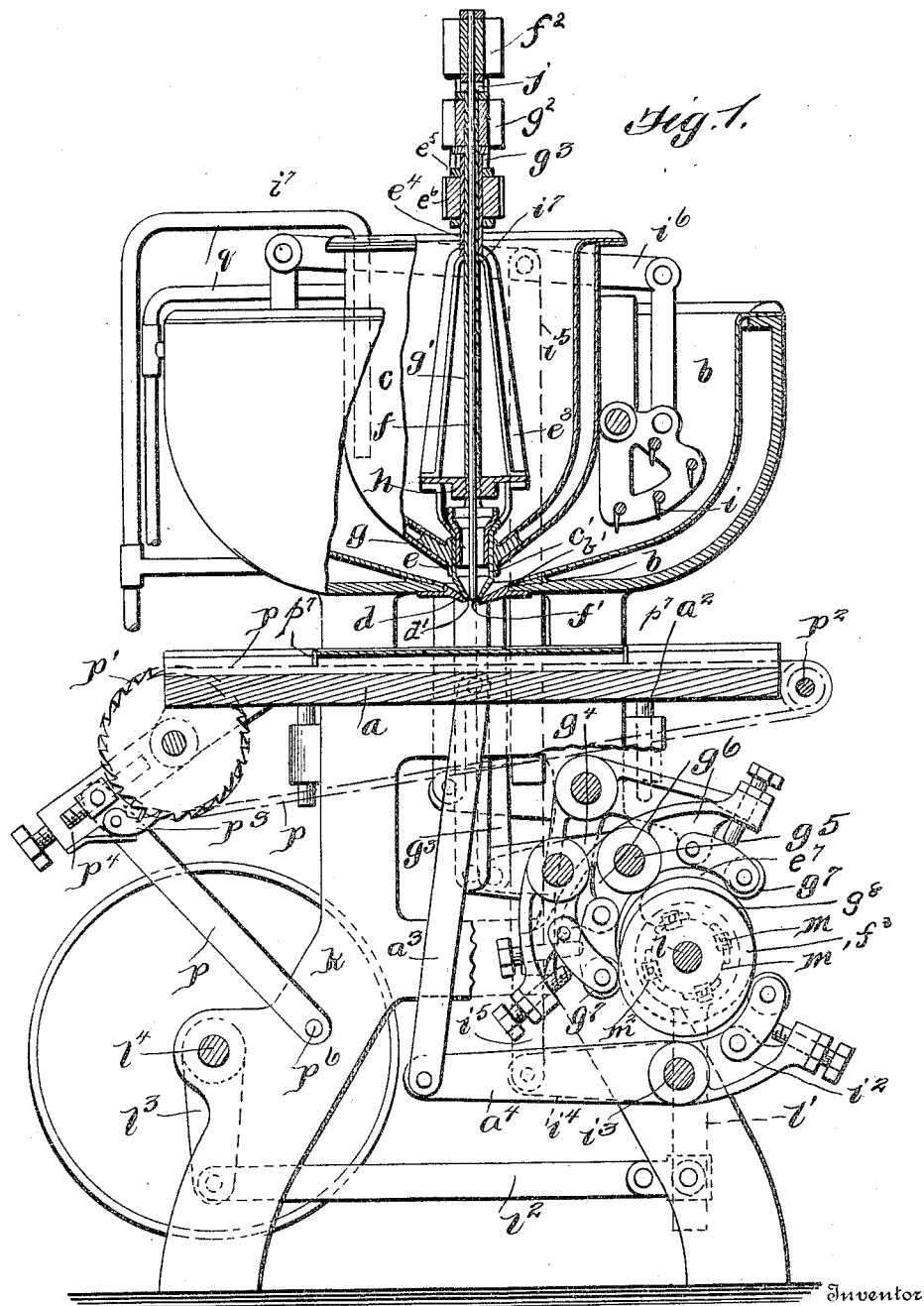

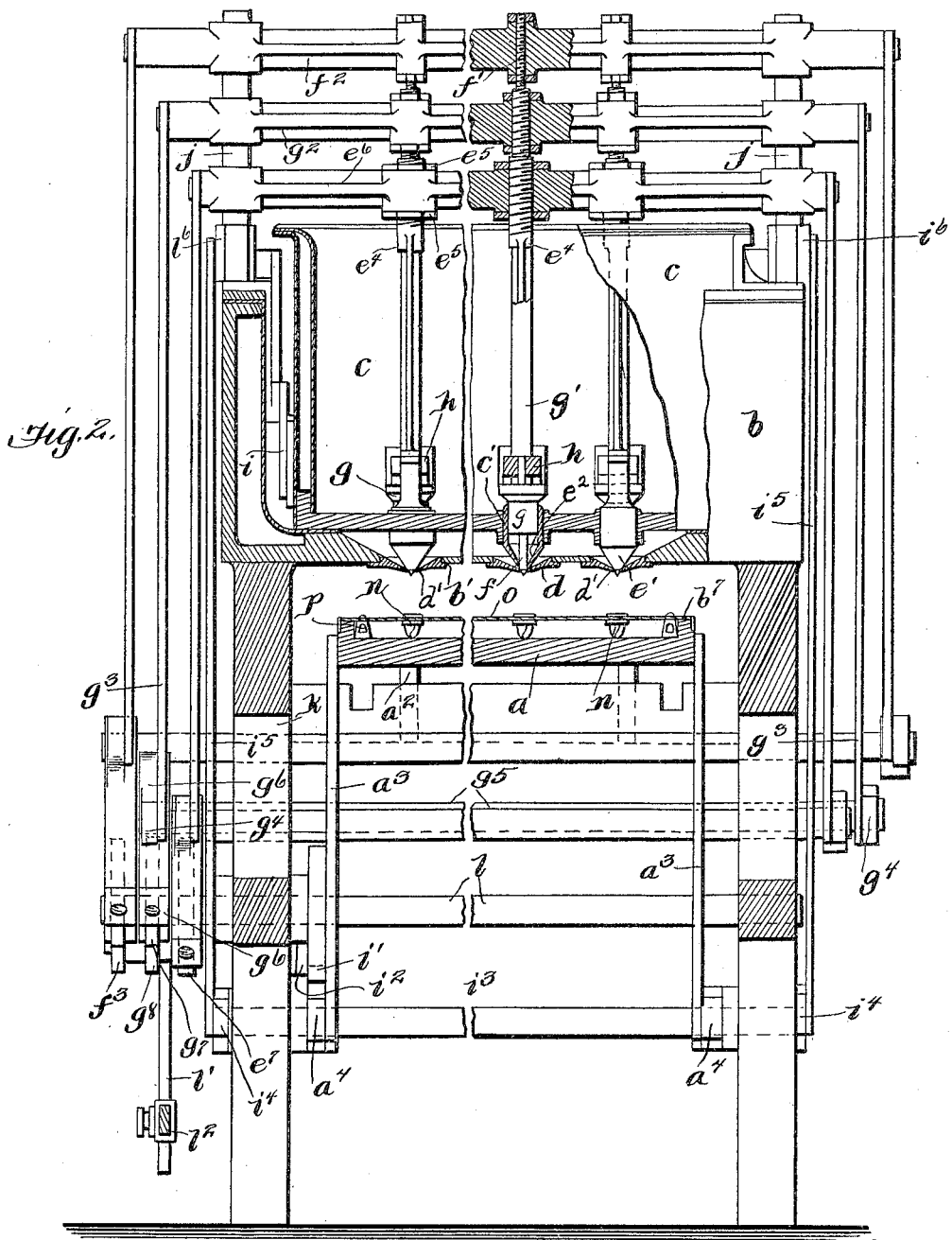

UNITED STATES PATENT OFFICE.

HERBERT THOMAS AVERAY-JONES, OF FOWNHOPE, ENGLAND.

APPARATUS FOR MANUFACTURING CONFECTIONERY AND THE LIKE.

No. 798,251.      Specification of Letters Patent.      Patented Aug. 29, 1905.

Application filed January 4, 1904. Serial No. 187,734.

*To all whom it may concern:*

Be it known that I, HERBERT THOMAS AVERAY-JONES, a subject of the King of Great Britain and Ireland, and a resident of Fownhope, county of Hereford, England, have invented certain new and useful Improvements in Apparatus for Manufacturing Confectionery and the Like, (for which I have filed an application for patent in Great Britain, No. 26,646, dated December 5, 1903;) and I do hereby declare the following to be a full, clear, and exact description of the same.

This invention relates to improved means for manufacturing confectionery articles and the like wherein one plastic material is enveloped by another, and has for its object to automatically effect the several operations incidental to forming an envelop of the surrounding material, (hereinafter termed the "coating,") charging the same with the filling material, (hereinafter termed the "filling,") inclosing the filling in the coating and molding the whole, so as to avoid handling of the coating and filling during such processes and to expedite the manufacture of the confection.

On the accompanying drawings, Figure 1 represents a sectional elevation of a machine embodying the improvements. Fig. 2 represents a sectional elevation at right angles to Fig. 1. Figs. 3 and 4 represent views at right angles to each other of a modification. Fig. 5 is a sectional elevation, on an enlarged scale, showing the operation of the coating and filling exudation and cutting-off means. Figs. 6 to 8 represent views, on a further enlarged scale, of a mold into which the coating and filling may exude.

$a$ represents a table to which vertical motion is imparted, as hereinafter described. Above the table are located receptacles $b$ $c$ for containing the coating and filling, the filling-container being arranged within the coating-container, Figs. 1 and 2, or laterally separable therefrom, Figs. 3 and 4, and made with an underprojecting base $b^2$. Each container is jacketed to admit of its being cooled or heated suitably to the nature of its contents, so that the latter may be kept at such temperature as the same will best work at, the jacket being connected by piping $q$ with any convenient means for supplying it with the cooling or the heating agent. Across the bottom of each container is made a plurality of outlets, Figs. 1 to 5, those $b'$ of the coating-container being vertically below those $c'$ of the filling-container. Each outlet $b'$ is fitted with a valve-seating $d$, having a tapering outlet $d'$ of any required shape for the coating. Each outlet $c'$ is fitted with a valve $e$, having a tapering nozzle $e'$, adapted to close the seating-outlet $d'$, and a central outlet $e^2$ of any required shape for the filling. Within each valve is arranged a valve-rod $f$, having a tapering terminal $f'$, adapted to close the valve-outlet $e^2$, and also a cylinder $g$, adapted to operate in connection with a piston $h$. The valves and pistons, the valve-rods and the cylinders are respectively adapted to be vertically reciprocated, so as to close or open the coating-outlets $d'$ and to close or open the filling-outlets $e^2$, the cylinders and pistons operating to cause the certain and regular exudation of the filling through its outlets, also a suctional action on the filling immediately precedent to its outlets being closed, so as to aid in effecting a clean severance thereof, and a suctional action within the valves on their outlets being closed operative in causing the valves to be recharged with filling from its container.

$i$ represents a circulating device located within the coating-container for circulating the coating about and causing a pressure thereon at its outlets and the consequent certain and regular exudation thereof through such outlets. The action of the circulator may be aided by a diaphragm $b^3$, Figs. 3 and 4, which operates in offering a contracted passage to the coating. Thus so long as the valve-seatings are unclosed by the valves the coating can outflow from its container, and so long as the valve-outlets are unclosed by the valve-rods the filling can outflow from its container, and during such outflows the coating and filling are separately acted on—the filling by said cylinders and pistons and the coating by said circulator—in such manner as to prevent any deposit of the filling and coating about their outlets and as to cause their certain and regular exudation and the sharp and clean severance of the filling. All such outflows and actions can be adjusted as may be required.

Each valve and piston is carried by a vertical member $e^3$, which allows free access of the filling to the valve, and at its upper part $e^4$ is tubular and secured by nuts $e^5$ to a cross-head $e^6$, arranged above the containers $b$ $c$. Each cylinder $g$ is in like manner secured to a tubular member $g'$, which passes through the valve member $e^4$ and is secured to a cross-head $g^2$, arranged above the cross-head $e^6$. Each valve-rod $f$ in like manner passes through the cylinder member $g'$ and is secured to a crosshead $f^2$, arranged above the cross-head $g^2$.

The respective seatings, valves, rods, cylinders, and pistons are arranged in axial relation. The valves and pistons may be stationary and the seatings, rods, and cylinders reciprocated in relation thereto.

The cross-heads $e^6$ $g^2$ $f^2$ at their ends are guided by standards $j$, supported by the machine-frame $k$ or the container $b$, and are reciprocated vertically in proper sequence by respectively similar connections, of which those of the cylinder cross-head $g^2$ will now be described. The ends of the cross-head $g^2$ are connected by rods $g^3$ to arms $g^4$ on a crossshaft $g^5$, supported by the machine-frame below the table. One end of the cross-shaft is fitted with bell-crank or double-acting crank arms $g^6$, carrying adjustable rollers $g^7$, adapted to work against the periphery of a double-acting adjustable oscillating cam $g^8$, fast on a cam-shaft $l$, which is rocked by an arm $l'$, which is adjustably connected to and operated by a connecting-rod $l^2$ and crank $l^3$ from a rotary main shaft $l^4$. The double-acting crank-arms and double-acting cam insure positive action of the cam on the cylinders in both motions of the latter.

The cams $e^7$ $g^8$ $f^3$, appertaining to the respective cross-heads $e^6$ $g^2$ $f^2$, are independently adjustable one on another by means of pins $m$ and slots $m'$ and are secured together by nuts $m^2$, so that they and the several crossheads are operated by the one connection $l^2$ from the main shaft.

The circulator $i$ may be of reciprocating action, Fig. 1, and operated from the camshaft $l$ by similar means to those used for operating the cross-heads—namely, a cam $i'$, roller-carrying lever $i^2$, cross-shaft $i^3$, arms $i^4$, and rods $i^5$, pivotally connected to a lever $i^6$, centered at $i^7$, or it may be of rotary motion, Fig. 3, and operated from the main shaft $l^4$ by any suitable connections.

In addition to the severence of the coating and filling by the operation of the valves and valve-rods and the suctional action of the cylinders the closing of the coating around the filling and the formation of the confection are aided by the operation of the table $a$, which being guided vertically, as at $a^2$, Figs. 1 and 2, is vertically lowered and raised by the operation of the shaft $i^3$ by means of arms $a^4$ and connecting-rods $a^3$, the falling motion of the table aiding in causing a sharp severance of the filling and the coating and the closing of the coating about the previously-severed filling.

The coating and filling fall from their containers into molds $n$, Fig. 2, by which the confection may be ornamented and have any required shape given to it. Each mold, Figs. 6 to 8, has a spirally-arranged fold $n'$ at which it is severed, flanges $n^2$ $n^3$ and an intervening tapered part $n^4$, by which it is located in an opening $o'$ in a mold-plate $o$, a plurality of which plates are supported by the table and are intermittently traversed therealong from the mold-charging position to a setting or cooling chamber or to where else required to be delivered by chains $p$, guided by chainwheels $p'$ $p^2$, carried by the table, the wheel $p'$ being operated by a pawl $p^3$, carried by an arm $p^4$, adjustably connected to a lever $p^5$, centered at $p^6$ at each rising motion of the table, and the chains $p$ have lugs $p^7$, adapted to catch against the plate ends. The severed formation of the molds permits of their being collapsed to allow of their being readily placed in the mold-plate openings and of their automatically springing open and locating themselves in said openings when freed from pressure, or the filling and coating may be dropdeposited from their containers onto flat boards, plates, or sheets of wood, metal, paper, or other suitable material, Fig. 1, intermittently traversed along the table.

In the operation of the coating and filling exudation and cutting-off apparatus, Fig. 5, (assuming all the outlets $d'$ $e^2$ to be closed,) the valves $e$ (with the rods $f$) first lift from the valve-seatings $d$, proportionately to the desired exudation of the coating, whereupon (the valves remaining open and stationary) the rods continue to lift to the full extent, whereupon (the valves and rods remaining stationary) the cylinders $g$ sharply rise around the pistons $h$, proportionately to the desired exudation of the filling, shutting off portions of the filling from the container-supply and forcing the same through the valveoutlets into the coating exuding from the valve-seating outlets, whereupon the rods close to the full extent, shutting off further exudation of the filling, whereupon the valves close upon the seatings, shutting off further exudation of the coating. The severance of the filling is aided by the descent of the cylinders, which immediately prior to the closing of the valves by the rods tend to create a partial vacuum within the valves, which cause a suctional severing action on the filling at the valve-outlets, while the continued descent of the cylinders, after the closing of the valves, clears the cylinders from the pistons, opens the valves to the filling-container, and causes a further suctional action within the valves, which operates in causing the valves to be recharged with filling from the container. During such operation the coatingcirculator $i$ operates in circulating the coating about and causing it to exude through the seating-outlets, and the table descends.

The outlets $b'$ may be shaped to the formation of the outlets $d'$, Fig. 3, and adapted to serve as the coating-outlets.

What I claim as my invention, and desire to secure by Letters Patent, is—

1. In machinery for enveloping one plastic material by another, in combination, a container for the coating having bottom outlets serving as the coating-outlets, a container for the filling having bottom outlets, the outlets of the containers being in vertical alinement, valves serving as the filling-outlets fitted one to each filling-container outlet and having a tapered nozzle adapted to close and open the coating-outlet in alinement therewith, guided rods fitted one to each valve adapted to close and open the filling-outlets, pistons one to each valve and partaking of its movements, guided cylinders fitted one to each valve adapted to work in connection with the pistons, and means for operating the valves the rods and the cylinders in proper sequence so as to open the coating-outlets, open the filling-outlets, exert pressure on the filling, close the filling-outlets sever the filling and recharge the valves, and close the coating-outlets, as set forth.

2. In machinery for enveloping one plastic material by another, in combination, a container for the coating having bottom outlets, a container for the filling having bottom outlets, the outlets of the containers being in vertical alinement, tapered valve-seatings serving as the coating-outlets fitted one to each container-outlet, valves serving as the filling-outlets fitted one to each filling-container outlet and having a tapered nozzle adapted to close and open the coating-outlet in alinement therewith, guided rods fitted one to each valve adapted to close and open the filling-outlets, pistons one to each valve and partaking of its movements, guided cylinders fitted one to each valve adapted to work in connection with the pistons, and means for operating the valves the rods and the cylinders in proper sequence so as to open the coating-outlets, open the filling-outlets, exert pressure on the filling, close the filling-outlets sever the filling and recharge the valves, and close the coating-outlets, as set forth.

3. In machinery for enveloping one plastic material by another, in combination, a container for the coating having bottom outlets, a container for the filling having bottom outlets, the outlets of the containers being in vertical alinement, tapered valve-seatings serving as the coating-outlets fitted one to each coating-container outlet, valves serving as the filling-outlets fitted one to each filling-container outlet and having a tapered nozzle adapted to close and open the coating-outlet in alinement therewith, guided rods fitted one to each valve adapted to close and open the filling-outlets, pistons, one to each valve and partaking of its movements, guided cylinders fitted one to each valve adapted to work in connection with the pistons, a guided table located below the containers, devices for receiving the deposits from the containers supported by the table, and means for operating the valves the rods the cylinders the table and said devices in proper sequence so as to open the coating-outlets, open the filling-outlets, exert pressure on the filling, close the filling-outlets sever the filling and recharge the valves, close the coating-outlets, receive the exuded coating and filling and close the former around the latter, and traverse the deposits along the table, as set forth.

4. In machinery for enveloping one plastic material by another, in combination, a container for the coating having bottom outlets, a container for the filling having bottom outlets, the outlets of the containers being in vertical alinement, tapered valve-seatings serving as the coating-outlets fitted one to each coating-container outlet, valves serving as the filling-outlets fitted one to each filling-container outlet and having a tapered nozzle adapted to close and open the coating-outlet in alinement therewith, guided rods fitted one to each valve adapted to close and open the filling-outlets, pistons one to each valve and partaking of its movements, guided cylinders fitted one to each valve adapted to work in connection with the pistons, a circulator adapted to circulate and exert pressure on the coating adjacent to its outlets, a guided table located below the containers, devices for receiving the deposits from the containers supported by the table, and means for operating the valves the rods the cylinders the coating-circulator the table and said devices, in proper sequence, so as to open the coating-outlets, open the filling-outlets, exert pressure on the coating and filling respectively, close the filling-outlets sever the filling and recharge the valves, close the coating-outlets, receive the exuded coating and filling and close the former around the latter and traverse the deposits along the table, as set forth.

In witness whereof I have hereunto set my hand in the presence of two witnesses.

HERBERT THOMAS AVERAY-JONES.

Witnesses:
   ALFRED CHARLES DAY,
   ARTHUR WALTER DAY.